3,561,100
BONDING BEARING ALLOY HAVING HIGH TIN CONTENT TO STEEL SUPPORT

Friedrich-Wilhelm Rabenau and Erich Jüger, Neckarsulm, Germany, assignors to Karl Schmidt GmbH, Neckarsulm, Germany, a corporation of Germany
Filed Jan. 26, 1967, Ser. No. 611,894
Claims priority, application Germany, Feb. 11, 1966, Sch 38,468
Int. Cl. B23k 31/02
U.S. Cl. 29—492        1 Claim

ABSTRACT OF THE DISCLOSURE

Bearings having a laminar structure comprising a steel support layer and a bearing alloy layer are produced. Light metal heterogeneous bearing alloys containing tin are treated, e.g. etched, to detin the surface thereof, are then coated with a light metal substantially impervious to molten tin, such as aluminum. The coated bearing alloy is then bonded to a steel support by heat and pressure without emergence of tin from the bearing alloy.

FIELD OF INVENTION

The application relates to a process for laminating steel and a light-metal bearing alloy containing free tin, according to for example application Ser. No. 610,669, filed Jan. 20, 1967, which corresponds to German application Sch. 38,374 of Jan. 25, 1966. Whereas according to the proposals of the copending application, the investment or coating of light metal bearing alloy containing more than about 7% tin is performed mainly for the purpose of preventing the tin from being squeezed out in the steel-bearing metal laminating process, the present application includes bearing alloys containing 3 to 7% tin, in which experience shows that naught but traces of tin are occasionally squeezed out.

According to the copending application, the laminating of steel and heterogeneous light metal bearing alloy containing over 7% tin, by application of heat and pressure, is facilitated by investing the bearing alloy with a light metal impervious to tin at the bonding temperature, and which is adhesive to steel in response to the bonding temperature and pressure. Following this investing, the bearing alloy is bonded to the steel by application of heat and pressure to effect the adherence. Heating can be effected by heating the steel to 550 to 750° C. and then passing it together with the cold, invested bearing strip through rolls, which provide the pressure. Heating and rolling are carried out in an inert atmosphere. The bonding can be carried out by the known roll-bonding procedure.

It is proposed therein to prevent molten tin from being squeezed out of the bearing alloy that is applied at a rolling temperature which is above the solidus of the bearing tin and is about 400 to 500° C., by first applying to both sides of the heterogeneous bearing alloy, before the cast ingot thereof is rolled, aluminum (i.e. pure aluminum) or a homogeneous aluminum alloy which remains fully ductile throughout all the stresses of further laminating operations. This is done by roughening, by for example, wirebrushing, both sides of the bearing alloy, which is about 4 to 10 mm. thick, wrapping it in a likewise wire-brushed or otherwise roughened aluminum or aluminum alloy sheet having a thickness of about 10–25% of the thickness of the bearing alloy, and then laminating this sandwich together in a rolling procedure in which the first pass is desirable as heavy as possible, achieving for example at least a 35% reduction, while the remaining passes total more than 75%.

The aluminum or aluminum alloy investment enveloping the heterogeneous bearing alloy is to be of such dimensions that even at the high laminating temperature of 400 to 500° C., the pressure produced by the laminating will not squeeze out any tin droplets. This is to be achieved either by using a very thick pure aluminum investment for example 0.1 to 0.15 mm. or by using an aluminum alloy investment that has a high yield point and good roll-laminating qualities, such as for example, Al-Mn, Al-Mg and Al-Mg-Si. The higher the yield point of the investment material is, the thinner the investment can be.

It is most desirable to envelop the bearing metal in an investment material consisting of a suitable alloy, preferably a commercially available Duralumin (Al-Cu-Mg alloy) sheet material, clad with aluminum, since, when the aluminum surface is wire-brushed, it establishes an excellent bond with the wire brushed roughened bearing alloy in the rolling process. This procedure furthermore has the advantage that, in the final rolling of the bearing material onto the steel, the roughened steel comes into direct contact with the pure aluminum and an excellent bond is produced between them even by relatively light rolling.

The method of the copending application in its preferred form involves the use of a very ductile and tough, prelaminated investment lamina of at least about 0.15 mm. thickness and that stands up extraordinarily well to the operation of laminating it to the steel. The investment lamina, when bonded to the bearing alloy, has a yield point of at least 10 kp./mm.$^2$. This cladding either has to be especially thick in the case of aluminum and low-alloy aluminum investments, or may be thinner in the case of investments having a high yield point, as in the case, for example, of an investment made of Duralplat, an aluminum-copper-magnesium alloy coated on all sides with aluminum.

It has been found that in the practice of the method of the copending application, some tin still gets to the surface in the prelaminating process and has a perceptibly disadvantageous effect in the actual laminating process.

SUMMARY OF THE INVENTION

According to the instant invention, the difficulty encountered in the process of the copending application is obviated. According to the invention, in a process for laminating steel in heterogeneous light metal bearing alloy containing free tin, wherein the bearing metal is coated or invested in a light metal for sealing the tin, and is thereafter laminated to the steel by application of heat and pressure to bond the bearing alloy to the steel, prior to the coating or investing of the bearing alloy, surface of the bearing alloy is detinned.

Detinning can be effected by etching with an appropriate acid. This etching can be preceded by a lye treatment.

This boundary-surface detinning can be performed with a mixture of nitric and hydrofluoric acid, by following an etching procedure such as the one described in German Pat. 1,031,604. The ingot surface is thus free of tin prior to the investing process, so that, when the thin investment of the aluminum (pure aluminum) or light metal alloy is applied, and when the main laminating process is performed, no more damage can be done by tin. Etching out the tin has the additional advantage that the ingot is given a textured or "porous" surface into which the investment material penetrates and thus protects the surface against the emergence of more tin. The bearing alloy ingot can be even more deeply textured if, prior to etching the surface with the mixed acids, the surface is roughened not only with caustic soda solution but also with hydrochloric acid. In the investment of continuous strips of bearing metal fed from coils, it is not economical to perform this etching treamtent after the bearing metal is unwound from the coils, so that it has to be shifted to the casting or preliminary rolling state. In this case there is the danger that, in the cold rolling of the textured, detinned surface, the tin-free surface may become too weak and too lacking in ductility for the laminating process which is performed at high temperature. For this reason it is furthermore recommended according to the invention to roll a homogeneous aluminum alloy or pure aluminum at room temperature into the textured, etched, surface-detinned and, if desired, preliminarily rolled ingots, simultaneously with the rolling out of the said ingots, and to subject them with the laminated and invested material to the hot process of lamination to steel.

In the case of aluminum bearing alloys of such high tin contents as 20 to 35% Sn, it is recommended that the steel surface to be clad in the hot laminating process be protected against the squeezing out of tin along the edges either by making the homogeneous light-metal alloy that is used to invest the stannous bearing alloy overlap the latter or by folding it at the margins so that a complete investment on all sides is achieved. This construction can also be employed where the bearing alloy contains less than 20% tin.

For the achievement of a better bond, it is recommended to subject the surface of the steel and the surface to be bonded thereto to a roughening treatment performed by belt grinding or sandblasting in the case of the steel and by wire brushing and/or etching in the case of the invested surface to be bonded thereto.

In the production of bearings, all investing metal is removed from the outer surface of the bearing metal.

While it is preferred to cover all surfaces of the bearing alloy strip with aluminum or light metal alloy, it is only essential that the surface of the bearing metal which is to be in confronting relation with the steel, be covered with the cladding material (aluminum or light metal alloy). The same is true for the detinning, i.e. it is only essential that the surface of the bearing metal which is to confront the steel be detinned, while it is preferable to detin the other surfaces of the strip as well.

BRIEF DESCRIPTION OF THE DRAWINGS

The construction according to the invention wherein investing laminae extend beyond edge portions of the bearing metal strip are illustrated in the drawing, wherein:

Referring to FIG. 1, laminae 2 overlie the bearing metal 1, and edge portions of the laminae extend outwardly of the edges of the bearing metal.

In FIG. 2, the end portions of the laminae are turned inwardly so as to enclose the bearing metal within the aluminum or light metal alloy.

Figure 1:
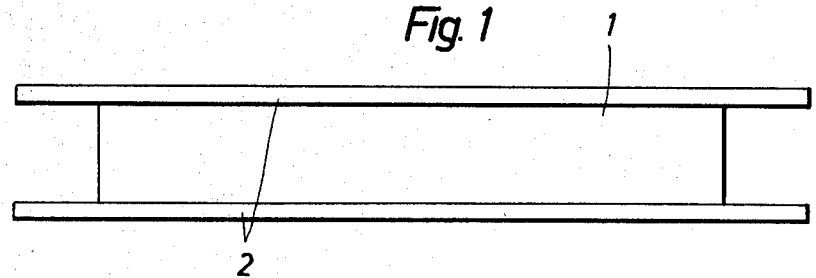
FIG. 1 is an end elevation view of a construction according to the invention.
Figure 2:
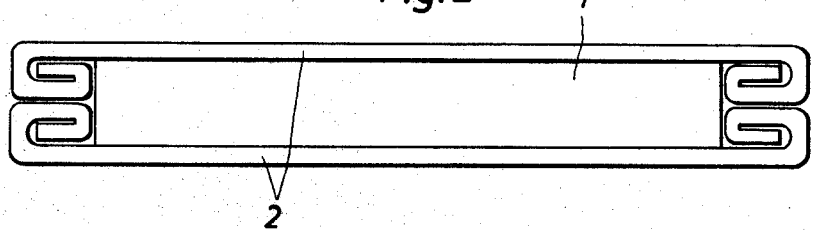
FIG. 2 and FIG. 3 show alternative constructions.
Figure 3:
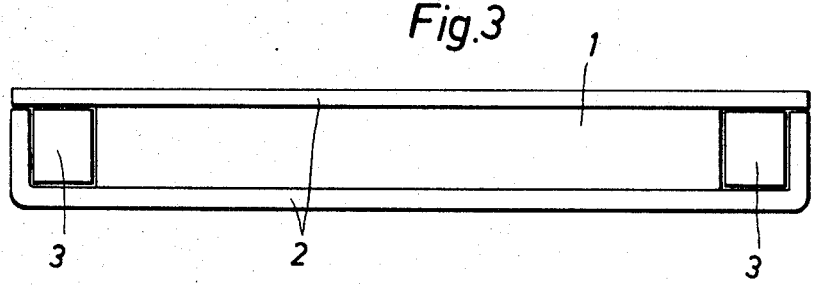

In the construction shown in FIG. 3, strips are disposed along the edges of the bearing metal strip 1. The strips 3 can be aluminum or light metal alloy of composition such as that of the laminae 2. This construction is particularly desirable in the case of relatively thick bearing metal strips.

While the invention has been described with respect to particular embodiments thereof, these embodiments are merely representative and do not serve to set forth the limits of the invention.

What is claimed is:

1. In a process for laminating steel and heterogeneous light metal bearing alloy containing free tin, wherein the bearing metal is coated with an Al-Cu-Mg alloy clad with aluminum for sealing the tin by cold rolling to bond the Al-Cu-Mg alloy to the bearing alloy, and is thereafter laminated to the steel by application of heat and pressure to bond the bearing alloy to the steel, the improvement which comprises detinning surface of the bearing alloy prior to coating it with said Al-Cu-Mg alloy clad with aluminum.

References Cited

UNITED STATES PATENTS

| 1,940,850 | 12/1933 | Derby | 29—472.3 |
| 3,195,991 | 7/1965 | Stern et al. | 29—492 |
| 3,384,950 | 5/1968 | Ruf | 29—488 |

JOHN F. CAMPBELL, Primary Examiner

R. J. SHORE, Assistant Examiner

U.S. Cl. X.R.

29—504

UNITED STATES PATENT OFFICE
CERTIFICATE OF CORRECTION

Patent No. 3,561,100              Dated Feb. 9, 1971

Inventor(s) Friedrich-Wilhelm Rabenau and Erich Jäger

It is certified that error appears in the above-identified patent and that said Letters Patent are hereby corrected as shown below:

Col. 2, line 18, after "brushed" insert --or otherwise--.

Signed and sealed this 21st day of December 1971.

(SEAL)
Attest:

EDWARD M. FLETCHER, JR.            ROBERT GOTTSCHALK
Attesting Officer                  Acting Commissioner of Patents